United States Patent
Chuang

(10) Patent No.: US 11,035,938 B2
(45) Date of Patent: Jun. 15, 2021

(54) ULTRASOUND SCANNING SYSTEM AND ULTRASOUND SCANNING METHOD

(71) Applicants: QISDA (SUZHOU) CO., Ltd., Suzhou (CN); QISDA CORPORATION, Taoyuan (TW)

(72) Inventor: Chia-En Chuang, Hsinchu County (TW)

(73) Assignees: QISDA (SUZHOU) CO., Ltd., Suzhou (CN); QISDA CORPORATION, Taoyuan (TW)

( * ) Notice: Subject to any disclaimer, the term of this patent is extended or adjusted under 35 U.S.C. 154(b) by 1091 days.

(21) Appl. No.: 15/072,375

(22) Filed: Mar. 17, 2016

(65) Prior Publication Data

US 2016/0282456 A1    Sep. 29, 2016

(30) Foreign Application Priority Data

Mar. 24, 2015  (TW) .................................. 104109419

(51) Int. Cl.
    *G01S 7/52* (2006.01)
(52) U.S. Cl.
    CPC ................................ *G01S 7/52082* (2013.01)
(58) Field of Classification Search
    CPC ........ G01S 7/52; G01S 15/89; G01S 15/8913; G01S 7/52082; G01S 7/52093; G01S 7/52095; G01N 29/14
    See application file for complete search history.

(56) References Cited

U.S. PATENT DOCUMENTS

| | | | | |
|---|---|---|---|---|
| 5,488,588 A | * | 1/1996 | Engeler | G01S 7/52026 367/103 |
| 5,600,675 A | * | 2/1997 | Engeler | G01S 7/527 367/7 |
| 5,797,847 A | * | 8/1998 | Miller | H03H 17/0664 327/254 |
| 6,693,590 B1 | * | 2/2004 | Toplicar | H01Q 3/26 342/372 |
| 9,049,091 B2 | * | 6/2015 | Bai | H04L 27/3863 |
| 2006/0009695 A1 | * | 1/2006 | Mathew | A61B 8/00 600/437 |
| 2007/0016044 A1 | * | 1/2007 | Blalock | G01S 7/52017 600/443 |
| 2007/0239001 A1 | * | 10/2007 | Mehi | G01S 15/8927 600/437 |

(Continued)

*Primary Examiner* — Isam A Alsomiri
*Assistant Examiner* — Amie M Ndure
(74) *Attorney, Agent, or Firm* — Winston Hsu

(57) ABSTRACT

An ultrasound scanning system includes a probe adaptor, a plurality of channel modules and a backend controller. The probe adaptor is connected to an ultrasound probe and has a plurality of frontend channels. Each of the channel modules has an identification code and includes a switch, a transmitter, a transmitter beamformer, a receiver and a receiver beamformer, wherein the switch is coupled to the probe adaptor, the transmitter is coupled to the switch, the transmitter beamformer is coupled to the transmitter, the receiver is coupled to the switch, and the receiver beamformer is coupled to the receiver. The backend controller is coupled to the probe adaptor, the transmitter beamformer of each of the channel modules and the receiver beamformer of each of the channel modules.

32 Claims, 6 Drawing Sheets

(56) References Cited

U.S. PATENT DOCUMENTS

| | | | |
|---|---|---|---|
| 2009/0203996 A1* | 8/2009 | Thiele | G01S 15/8993 |
| | | | 600/441 |
| 2010/0067622 A1* | 3/2010 | Komaili | H03D 3/009 |
| | | | 375/345 |
| 2011/0169689 A1* | 7/2011 | Wang | G01S 19/26 |
| | | | 342/357.3 |
| 2012/0010508 A1* | 1/2012 | Sokulin | A61B 8/52 |
| | | | 600/443 |
| 2015/0022394 A1* | 1/2015 | McConnell | H04B 1/7097 |
| | | | 342/357.51 |
| 2015/0171906 A1* | 6/2015 | Wong | H04B 1/30 |
| | | | 375/346 |

* cited by examiner

ULTRASOUND SCANNING SYSTEM AND ULTRASOUND SCANNING METHOD

BACKGROUND OF THE INVENTION

1. Field of the Invention

The invention relates to an ultrasound scanning system and an ultrasound scanning method and, more particularly, to an ultrasound scanning system and an ultrasound scanning method capable of expanding channel module.

2. Description of the Prior Art

Since ultrasound scanning does not destroy material structure and cell, ultrasound scanning is in widespread use for the field of material and clinical diagnosis. So far a number of channels of an ultrasound scanning system are always fixed. For example, the number of channels in a frontend circuit of a large-sized ultrasound scanning system are larger than or equal to 128, the number of channels in a frontend circuit of a portable ultrasound scanning system are equal to 64, and the number of channels in a frontend circuit of a handheld ultrasound scanning system are equal to 16 or 32. Since the number of channels cannot be expanded, the manufacturer of the ultrasound scanning system has to design various frontend circuits for different ultra sound systems with different number of channels. In other words, one frontend circuit cannot be applied to different ultra sound systems, such that it is not flexible in use and it will increase development time when designing different ultra sound systems.

SUMMARY OF THE INVENTION

An objective of the invention is to provide an ultrasound scanning system and an ultrasound scanning method capable of expanding channel module, so as to solve the aforesaid problems.

According to an embodiment of the invention, an ultrasound scanning system comprises a probe adaptor, a plurality of channel modules and a backend controller. The probe adaptor is connected to an ultrasound probe and the probe adaptor has a plurality of frontend channels. Each of the channel modules has an identification code and each of the channel modules comprises a switch, a transmitter, a transmitter beamformer, a receiver and a receiver beamformer, wherein the switch is coupled to the probe adaptor, the transmitter is coupled to the switch and the probe adaptor, the transmitter beamformer is coupled to the transmitter, the receiver is coupled to the switch, and the receiver beamformer is coupled to the receiver. The backend controller is coupled to the probe adaptor, the transmitter beamformer of each of the channel modules and the receiver beamformer of each of the channel modules. The backend controller comprises a demodulator. The backend controller transmits a transmitter beamforming information to the transmitter beamformer of each of the channel modules. Each of the transmitter beamformers converts a part of the transmitter beamforming information into a plurality of transmitter beamforming signals according to the identification code correspondingly. Each of the transmitters transmits the transmitter beamforming signals to the probe adaptor. The transmitter beamforming signals drive the ultrasound probe to emit a plurality of ultrasound signals through the frontend channels. Each of the receivers receives a plurality of reflected signals of the ultrasound signals through the ultrasound probe and the probe adaptor. Each of the receiver beamformers converts the reflected signals into a plurality of receiver beamforming signals. The backend controller merges the receiver beamforming signals generated by each of the channel modules into a scanning line signal according to the identification codes. The demodulator divides the scanning line signal into an in-phase signal and a quadrature-phase signal.

According to another embodiment of the invention, an ultrasound scanning method is applied to an ultrasound scanning system and the ultrasound scanning system comprises a probe adaptor, a plurality of channel modules and a backend controller, wherein the channel modules are coupled to the probe adaptor and the backend controller is coupled to the probe adaptor and the channel modules. The probe adaptor is connected to an ultrasound probe and the probe adaptor has a plurality of frontend channels. Each of the channel modules has an identification code. The ultrasound scanning method comprises steps of: the backend controller transmitting a transmitter beamforming information to each of the channel modules; each of the channel modules converting a part of the transmitter beamforming information into a plurality of transmitter beamforming signals according to the identification code correspondingly and transmitting the transmitter beamforming signals to the probe adaptor; the transmitter beamforming signals driving the ultrasound probe to emit a plurality of ultrasound signals through the frontend channels; each of the channel modules receiving a plurality of reflected signals of the ultrasound signals through the ultrasound probe and the probe adaptor and converting the reflected signals into a plurality of receiver beamforming signals; and the backend controller merging the receiver beamforming signals generated by each of the channel modules into a scanning line signal according to the identification codes and dividing the scanning line signal into an in-phase signal and a quadrature-phase signal.

According to another embodiment of the invention, an ultrasound scanning system comprises a probe adaptor, a plurality of channel modules and a backend controller. The probe adaptor is connected to an ultrasound probe and the probe adaptor has a plurality of frontend channels. Each of the channel modules has an identification code and each of the channel modules comprises a switch, a transmitter, a transmitter beamformer, a receiver, a receiver beamformer and a demodulator, wherein the switch is coupled to the probe adaptor, the transmitter is coupled to the switch and the probe adaptor, the transmitter beamformer is coupled to the transmitter, the receiver is coupled to the switch, the receiver beamformer is coupled to the receiver, and the demodulator is coupled to the receiver beamformer. The backend controller is coupled to the probe adaptor, the transmitter beamformer of each of the channel modules and the receiver beamformer of each of the channel modules. The backend controller transmits a transmitter beamforming information to the transmitter beamformer of each of the channel modules. Each of the transmitter beamformers converts a part of the transmitter beamforming information into a plurality of transmitter beamforming signals according to the identification code correspondingly. Each of the transmitters transmits the transmitter beamforming signals to the probe adaptor. The transmitter beamforming signals drive the ultrasound probe to emit a plurality of ultrasound signals through the frontend channels. Each of the receivers receives a plurality of reflected signals of the ultrasound signals through the ultrasound probe and the probe adaptor. Each of the receiver beamformers converts the reflected signals into a plurality of receiver beamforming signals. Each of the demodulators divides each of the receiver beamforming signals into an in-phase signal and a quadrature-phase signal. The backend controller merges the in-phase signals generated by each of the channel modules into a single in-phase signal and merges the quadrature-phase signals generated by each of the channel modules into a single quadrature-phase signal according to the identification codes.

According to another embodiment of the invention, an ultrasound scanning method is applied to an ultrasound scanning system and the ultrasound scanning system comprises a probe adaptor, a plurality of channel modules and a backend controller, wherein the channel modules are coupled to the probe adaptor and the backend controller is coupled to the probe adaptor and the channel modules. The probe adaptor is connected to an ultrasound probe and the probe adaptor has a plurality of frontend channels. Each of the channel modules has an identification code. The ultrasound scanning method comprises steps of: the backend controller transmitting a transmitter beamforming information to each of the channel modules; each of the channel modules converting a part of the transmitter beamforming information into a plurality of transmitter beamforming signals according to the identification code correspondingly and transmitting the transmitter beamforming signals to the probe adaptor; the transmitter beamforming signals driving the ultrasound probe to emit a plurality of ultrasound signals through the frontend channels; each of the channel modules receiving a plurality of reflected signals of the ultrasound signals through the ultrasound probe and the probe adaptor and converting the reflected signals into a plurality of receiver beamforming signals; each of the channel modules divides each of the receiver beamforming signals into an in-phase signal and a quadrature-phase signal; and the backend controller merging the in-phase signals generated by each of the channel modules into a single in-phase signal and merging the quadrature-phase signals generated by each of the channel modules into a single quadrature-phase signal according to the identification codes.

As mentioned in the above, the invention integrates the switch, the transmitter, the transmitter beamformer, the receiver and the receiver beamformer into the channel module and couples a plurality of channel modules between the probe adaptor and the backend controller, wherein a number of channels of each channel module may be 32, 64 or other values. Accordingly, a user or manufacturer can increase or decrease the number of channel modules according to the needed number of channels of different ultrasound scanning systems, so as to expand the channel module. Furthermore, each of the channel modules can know which part of the transmitter beamforming information it should process according to its identification code, so the backend controller may transmit the transmitter beamforming information to each of the channel modules by a broadcasting manner. That is to say, the backend controller needs not to divide the transmitter beamforming information into different contents for different channel modules. Moreover, the invention may integrate the demodulator into the channel module or the backend controller selectively according to practical applications.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
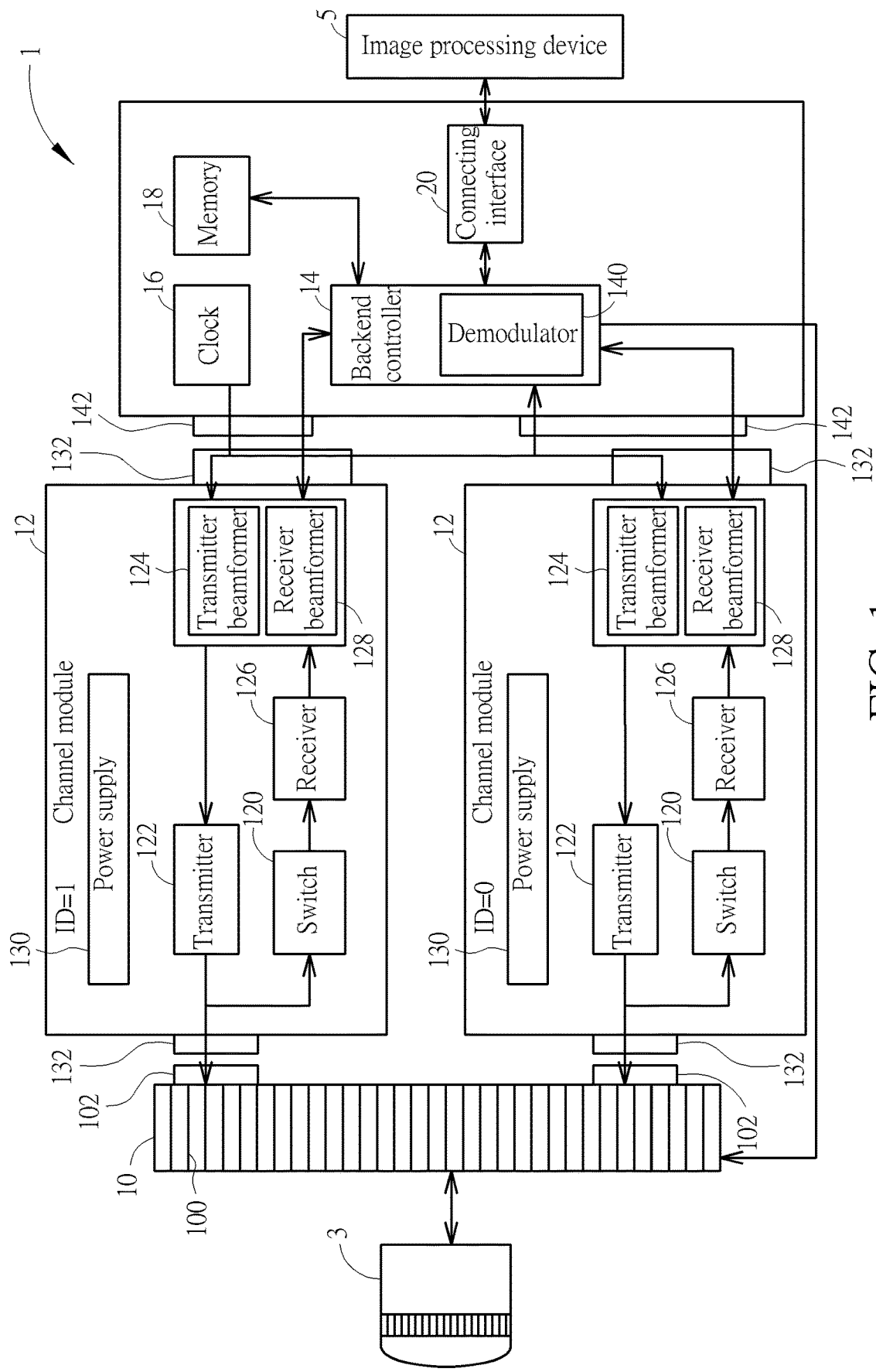
FIG. 1 is a functional block diagram illustrating an ultrasound scanning system according to an embodiment of the invention.
Figure 2:
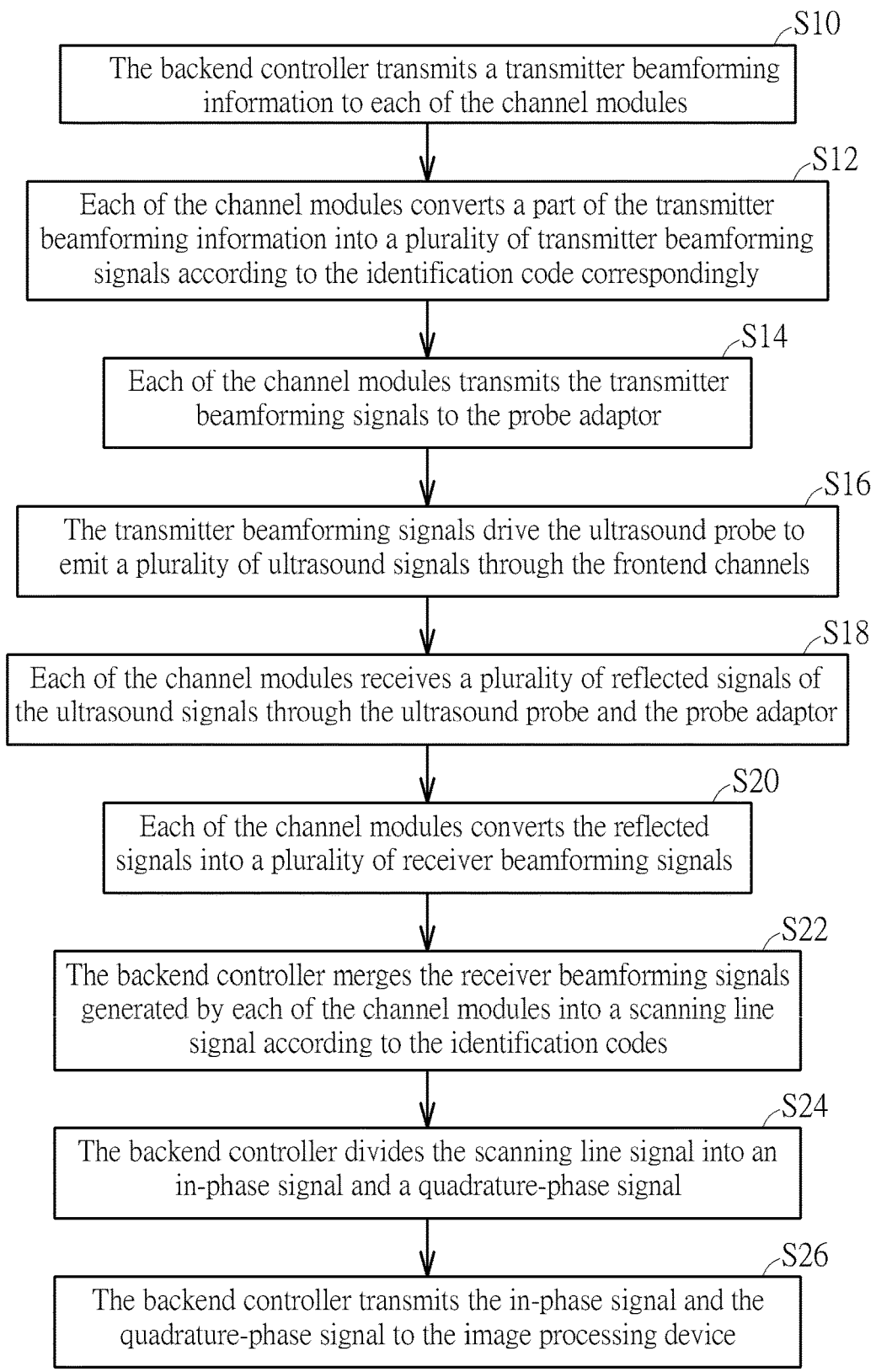
FIG. 2 is a flowchart illustrating an ultrasound scanning method according to an embodiment of the invention.

Referring to FIGS. 1 and 2, FIG. 1 is a functional block diagram illustrating an ultrasound scanning system 1 according to an embodiment of the invention and FIG. 2 is a flowchart illustrating an ultrasound scanning method according to an embodiment of the invention. The ultrasound scanning method shown in FIG. 2 is applied to the ultrasound scanning system 1 shown in FIG. 1.

As shown in FIG. 1, the ultrasound scanning system 1 comprises a probe adaptor 10, a plurality of channel modules 12 and a backend controller 14. The probe adaptor 10 is connected to an ultrasound probe 3 and the probe adaptor 10 has a plurality of frontend channels 100. Each of the channel modules 12 comprises a switch 120, a transmitter 122, a transmitter beamformer 124, a receiver 126 and a receiver beamformer 128, wherein the switch 120 is coupled to the probe adaptor 10, the transmitter 122 is coupled to the switch 120 and the probe adaptor 10, the transmitter beamformer 124 is coupled to the transmitter 122, the receiver 126 is coupled to the switch 120, and the receiver beamformer 128 is coupled to the receiver 126. The backend controller 14 is coupled to the probe adaptor 10, the transmitter beamformer 124 of each of the channel modules 12 and the receiver beamformer 128 of each of the channel modules 12. Furthermore, the backend controller 14 comprises a demodulator 140.

In this embodiment, a number of channels of each channel module 12 may be 32, 64 or other values. The ultrasound scanning system 1 shown in FIG. 1 comprises two channel modules 12. However, a user or manufacturer can increase or decrease the number of channel modules 12 according to the needed number of channels of different ultrasound scanning systems, so as to expand the channel module 12.

Each of the channel modules 12 further comprises a power supply 130 for supplying power to the switch 120, the transmitter 122, the transmitter beamformer 124, the receiver 126 and the receiver beamformer 128. In practical applications, the power supply 130 may supply high voltage level to the switch 120 and the transmitter 122 and supply low voltage level to the transmitter beamformer 124, the receiver 126 and the receiver beamformer 128. Since the power supply 130 of each channel module 12 is independent from another, the power capacity of the power supply 130 is considered for one single channel module, such that the invention can achieve the objective of expanding the channel module 12 more easily.

The probe adaptor 10 may comprise a plurality of first connectors 102, each of the channel modules 12 may comprise two second connectors 132, and the backend controller 14 may comprise a plurality of third connectors 142. One of the two second connectors 132 is detachably connected to one of the first connectors 102 and the other one of the two second connectors 132 is detachably connected to one of the third connectors 142, such that the channel module 12 is detachably connected between the probe adaptor 10 and the backend controller 14. Accordingly, a user or manufacturer can increase or decrease the number of channel modules 12 according to the needed number of channels of different ultrasound scanning systems, so as to expand the channel module 12. It should be noted that the number of first connectors 102 of the probe adaptor 10 and the number of third connectors 142 of the backend controller 14 may be determined according to the number of channel modules 12.

As shown in FIG. 1, each of the channel modules 12 has an identification code ID. In this embodiment, the identification code ID of each of the channel modules 12 may be assigned by the backend controller 14. In another embodiment, the identification code ID of each of the channel modules 12 may be obtained by detecting positions of the first connector 102 and the third connector 142 connected to each of the channel modules 12.

In this embodiment, the ultrasound scanning system 1 may further comprise a clock 16, a memory 18 and a connecting interface 20. The clock 16 is coupled to the transmitter beamformer 124 of each of the channel modules 12 and the receiver beamformer 128 of each of the channel modules 12, wherein the clock 16 provides clock signals for the transmitter beamformer 124 and the receiver beamformer 128. The memory 18 is coupled to the backend controller 14. The connecting interface 20 is coupled to the backend controller 14 and connected to an image processing device 5. In practical applications, the connecting interface 20 may be a universal serial bus (USB) interface, a Firewire interface, a Thunderbolt interface, an Ethernet interface or other data transmitting interfaces, and the image processing device 5 may be a desktop computer, a notebook computer, a tablet computer, a handheld electronic device or other electronic devices with image processing function.

When using the ultrasound scanning system 1 to perform an ultrasound scanning process, first of all, the backend controller 14 transmits a transmitter beamforming information to the transmitter beamformer 124 of each of the channel modules 12 (step S10 shown in FIG. 2). In this embodiment, each of the channel modules 12 can know which part of the transmitter beamforming information it should process according to its identification code ID, so the backend controller 14 may transmit the transmitter beamforming information to each of the channel modules 12 by a broadcasting manner. That is to say, the backend controller 14 needs not to divide the transmitter beamforming information into different contents for different channel modules 12. Afterward, the transmitter beamformer 124 of each of the channel modules 12 converts a part of the transmitter beamforming information into a plurality of transmitter beamforming signals according to the identification code ID correspondingly (step S12 shown in FIG. 2). Then, the transmitter 122 of each of the channel modules 12 transmits the transmitter beamforming signals to the probe adaptor 10 (step S14 shown in FIG. 2). Then, the transmitter beamforming signals drive the ultrasound probe 3 to emit a plurality of ultrasound signals through the frontend channels 100 of the probe adaptor 10 (step S16 shown in FIG. 2). Then, the receiver 126 of each of the channel modules 12 receives a plurality of reflected signals of the ultrasound signals through the ultrasound probe 3 and the probe adaptor 10 (step S18 shown in FIG. 2). Then, the receiver beamformers 128 of each of the channel modules 12 converts the reflected signals into a plurality of receiver beamforming signals (step S20 shown in FIG. 2). Then, the backend controller 14 merges the receiver beamforming signals generated by each of the channel modules 12 into a scanning line signal according to the identification codes ID of each of the channel modules 12 (step S22 shown in FIG. 2). Then, the demodulator 140 of the backend controller 14 divides the scanning line signal into an in-phase signal and a quadrature-phase signal (step S24 shown in FIG. 2). Finally, the backend controller 14 transmits the in-phase signal and the quadrature-phase signal to the image processing device 5 through the connecting interface 20, so as to generate an ultrasound scanning image in the image processing device 5 (step S26 shown in FIG. 2).

In this embodiment, the memory 18 is used to store the in-phase signal and the quadrature-phase signal of the scanning line signal temporarily. After the memory 18 is full of the in-phase signal and the quadrature-phase signal, the backend controller 14 transmits the in-phase signal and the quadrature-phase signal to the image processing device 5 through the connecting interface 20. Needless to say, the backend controller 14 may transmit the in-phase signal and the quadrature-phase signal to the image processing device 5 through the connecting interface 20 directly without storing the in-phase signal and the quadrature-phase signal in the memory 18.

Figure 3:
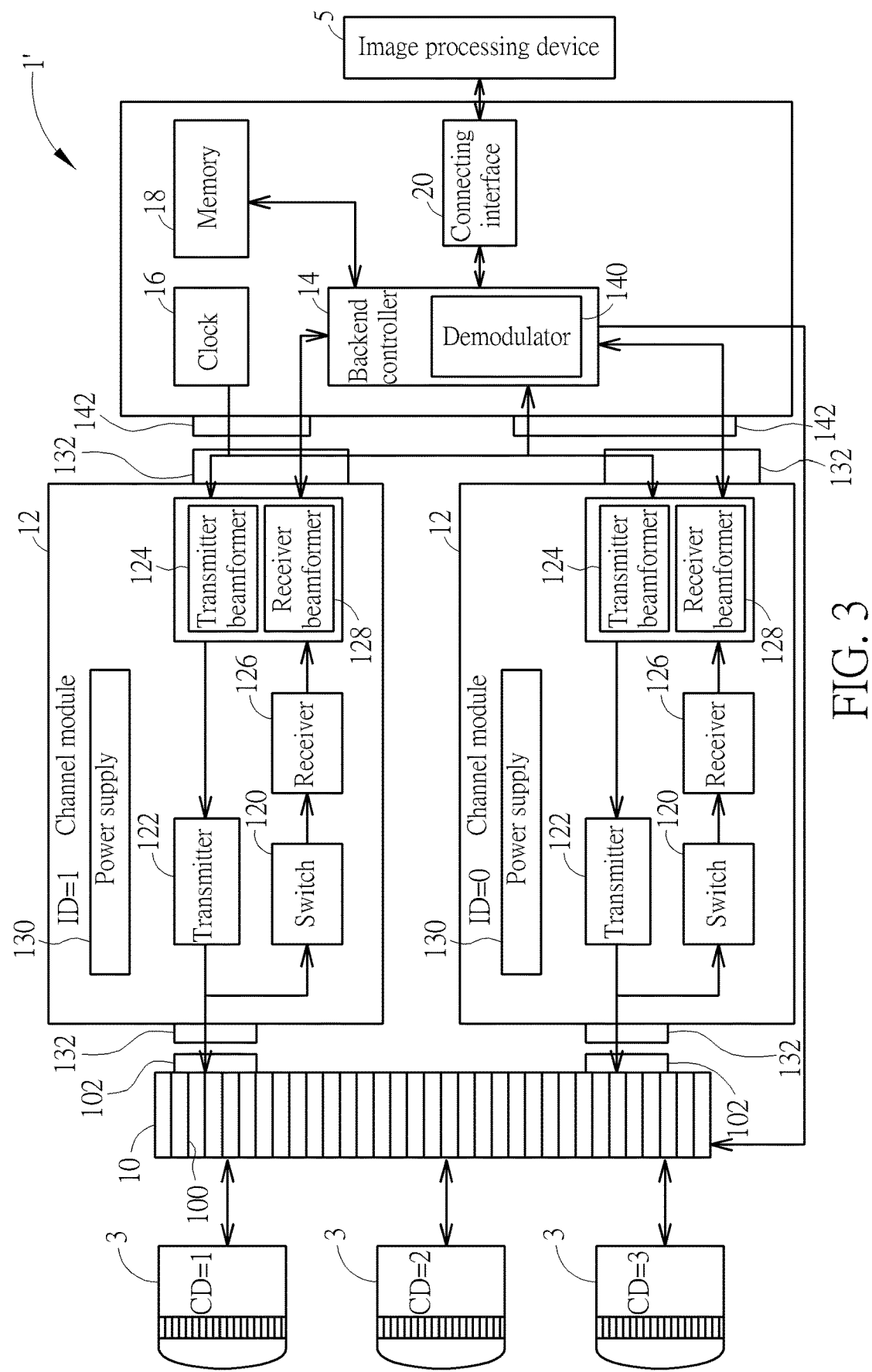
FIG. 3 is a functional block diagram illustrating an ultrasound scanning system according to another embodiment of the invention.

Referring to FIG. 3, FIG. 3 is a functional block diagram illustrating an ultrasound scanning system 1' according to another embodiment of the invention. The main difference between the ultrasound scanning system 1' and the aforesaid ultrasound scanning system 1 is that the probe adaptor 10 of the ultrasound scanning system 1' is connected to a plurality of the ultrasound probes 3 and each of the ultrasound probes 3 has a unique code CD. In this embodiment, the backend controller 14 may control one of the ultrasound probes 3 to perform an ultrasound scanning process according to the unique codes CD of the ultrasound probes 3. Furthermore, when a number of channels of the ultrasound probe 3, which is performing the ultrasound scanning process, are different from a total number of channels of the channel modules 12, the backend controller 14 may switch the channels of the ultrasound probe 3 in response to the channels of the channel modules 12 correspondingly. It should be noted that the same elements in FIG. 3 and FIG. 1 are represented by the same numerals, so the repeated explanation will not be depicted herein again.

Figure 4:
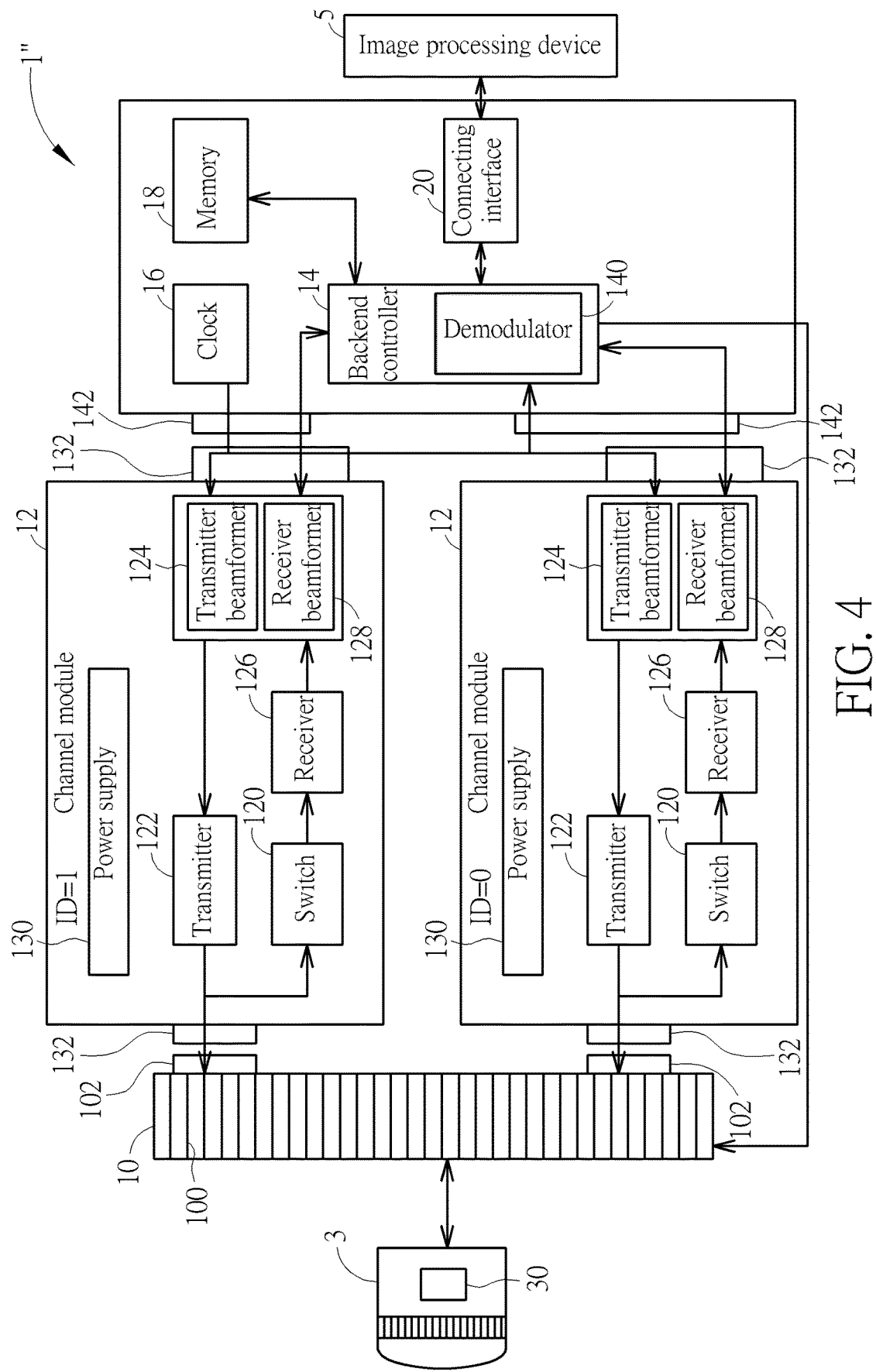
FIG. 4 is a functional block diagram illustrating an ultrasound scanning system according to another embodiment of the invention.

Referring to FIG. 4, FIG. 4 is a functional block diagram illustrating an ultrasound scanning system 1" according to another embodiment of the invention. The main difference between the ultrasound scanning system 1" and the aforesaid ultrasound scanning system 1 is that the ultrasound probe 3 of the ultrasound scanning system 1' comprises a sensor 30 and the sensor 30 is used to sense a sensing value. In this embodiment, the backend controller 14 may read the sensing value sensed by the sensor 30 through the probe adaptor 10 for follow-up determination. For example, the sensor 30 may be a temperature sensor, so the sensing value sensed by the sensor 30 may be a temperature. It should be noted that the same elements in FIG. 4 and FIG. 1 are represented by the same numerals, so the repeated explanation will not be depicted herein again.

Figure 5:
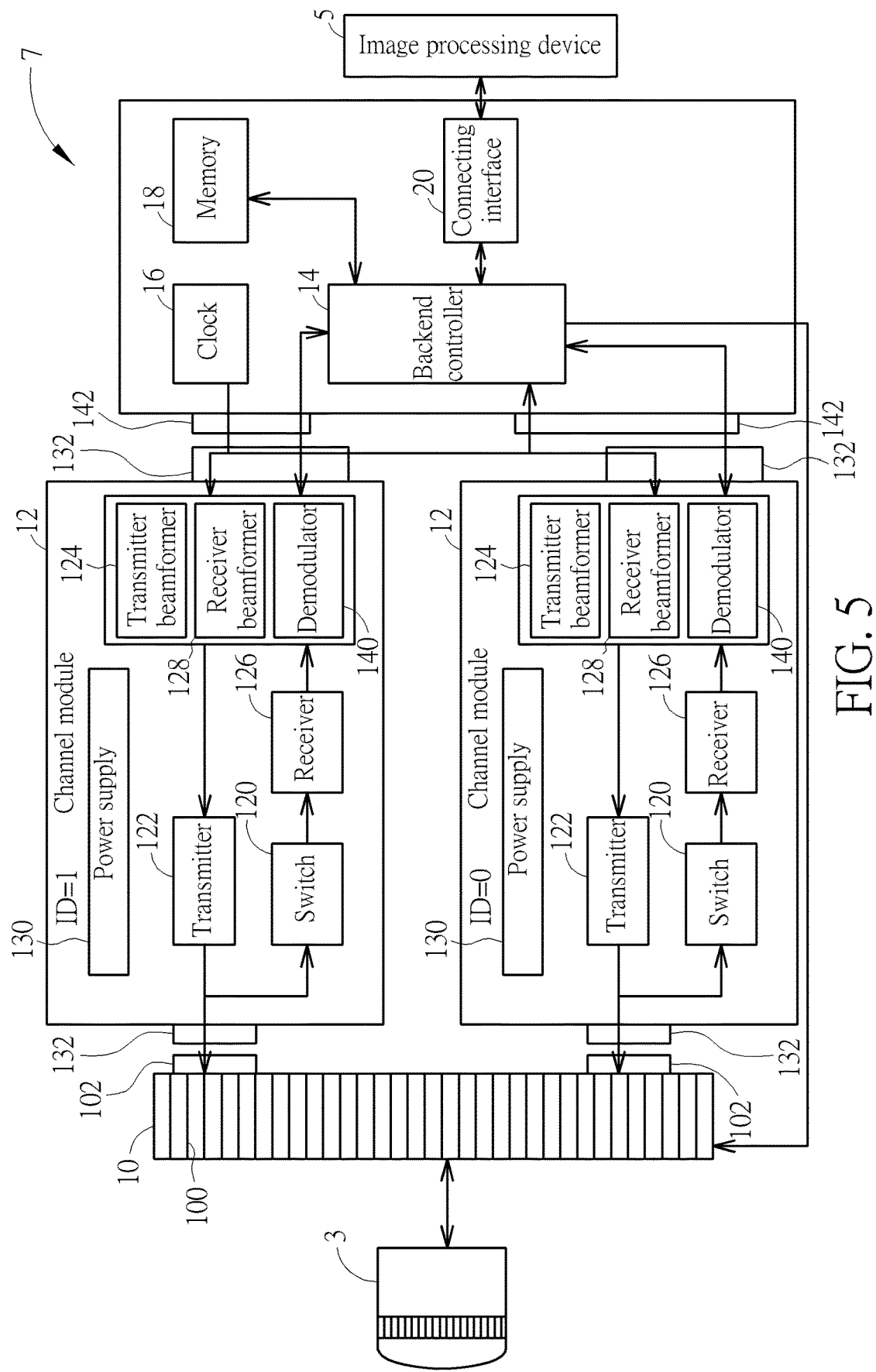
FIG. 5 is a functional block diagram illustrating an ultrasound scanning system according to another embodiment of the invention.
Figure 6:
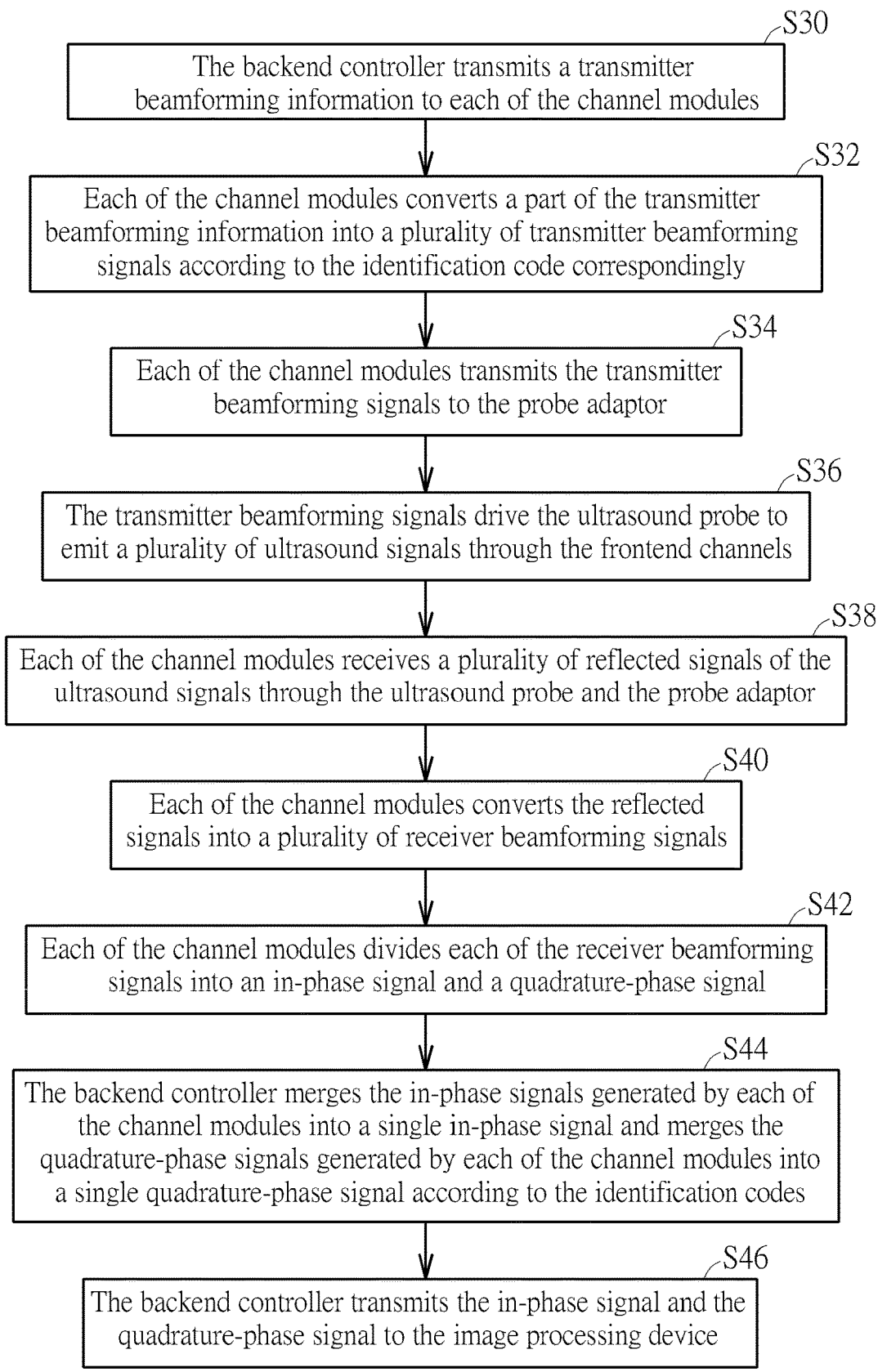
FIG. 6 is a flowchart illustrating an ultrasound scanning method according to another embodiment of the invention.

Referring to FIGS. 5 and 6, FIG. 5 is a functional block diagram illustrating an ultrasound scanning system 7 according to another embodiment of the invention and FIG. 6 is a flowchart illustrating an ultrasound scanning method according to another embodiment of the invention. The ultrasound scanning method shown in FIG. 6 is applied to the ultrasound scanning system 7 shown in FIG. 5. The main difference between the ultrasound scanning system 1" and the aforesaid ultrasound scanning system 1 is that the demodulator 140 of the ultrasound scanning system 7 is integrated into the channel module 12 rather than being disposed in the backend controller 14. As shown in FIG. 5, the demodulator 140 is coupled to the receiver beamformer 128 and the backend controller 14. When the demodulator 140 is integrated into the channel module 12, the power supply 130 also supplies power to the demodulator 140. It should be noted that the same elements in FIG. 5 and FIG. 1 are represented by the same numerals, so the repeated explanation will not be depicted herein again.

When using the ultrasound scanning system 7 to perform an ultrasound scanning process, the steps S30-S40 shown in FIG. 6 is the same as the steps S10-S20 shown in FIG. 2, so the repeated explanation will not be depicted herein again. After the receiver beamformers 128 of each of the channel modules 12 converts the reflected signals into a plurality of receiver beamforming signals, the demodulator 140 of each of the channel modules 12 divides each of the receiver beamforming signals into an in-phase signal and a quadrature-phase signal (step S42 shown in FIG. 6). Then, the backend controller 14 merges the in-phase signals generated by each of the channel modules 12 into a single in-phase signal and merges the quadrature-phase signals generated by each of the channel modules 12 into a single quadrature-phase signal according to the identification codes ID of the channel modules 12 (step S44 shown in FIG. 6). Finally, the backend controller 14 transmits the in-phase signal and the quadrature-phase signal to the image processing device 5 through the connecting interface 20, so as to generate an ultrasound scanning image in the image processing device 5 (step S46 shown in FIG. 6).

In other words, the invention may integrate the demodulator 140 into the channel module 12 or the backend controller 14 selectively according to practical applications. Furthermore, the embodiments shown in FIGS. 3 and 4 may also be applied to the ultrasound scanning system 7 shown in FIG. 5 and the repeated explanation will not be depicted herein again.

It should be noted that when the transmitter 122 is transmitting the transmitter beamforming signal to the probe adaptor 10, the switch 120 is turned off, so as to prevent the receiver 126 from being damaged by the high voltage level of the transmitter 122; and when the receiver 16 is receiving the reflected signals, the switch 120 is turn on, such that the transmitter 122 has high impedance while the receiver 126 receives the reflected signals of the ultrasound signals through the ultrasound probe 3 and the probe adaptor 10.

It should be noted that the control logic of the steps S10-S26 shown in FIG. 2 and the steps S30-S46 shown in FIG. 6 can be implemented by software. Needless to say, each part or function of the control logic may be implemented by software, hardware or the combination thereof. Moreover, the aforesaid probe adaptor 10, backend controller 14, clock 16, memory 18, switch 120, transmitter 122, transmitter beamformer 124, receiver 126, receiver beamformer 128, power supply 130 and demodulator 140 may be implemented by circuit design.

As mentioned in the above, the invention integrates the switch, the transmitter, the transmitter beamformer, the receiver and the receiver beamformer into the channel module and couples a plurality of channel modules between the probe adaptor and the backend controller, wherein a number of channels of each channel module may be 32, 64 or other values. Accordingly, a user or manufacturer can increase or decrease the number of channel modules according to the needed number of channels of different ultrasound scanning systems, so as to expand the channel module. Furthermore, each of the channel modules can know which part of the transmitter beamforming information it should process according to its identification code, so the backend controller may transmit the transmitter beamforming information to each of the channel modules by a broadcasting manner. That is to say, the backend controller needs not to divide the transmitter beamforming information into different contents for different channel modules. Moreover, the invention may integrate the demodulator into the channel module or the backend controller selectively according to practical applications.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An ultrasound scanning system comprising:
a probe adaptor connected to an ultrasound probe, the probe adaptor having a plurality of frontend channels;
a plurality of channel modules, each of the channel modules having an identification code, each of the channel modules comprising:
a switch coupled to the probe adaptor;
a transmitter coupled to the switch and the probe adaptor;
a transmitter beamformer coupled to the transmitter;
a receiver coupled to the switch; and
a receiver beamformer coupled to the receiver;
a backend controller coupled to the probe adaptor, the transmitter beamformer of each of the channel modules and the receiver beamformer of each of the channel modules, the backend controller comprising a demodulator;
wherein the backend controller transmits a transmitter beamforming information to the transmitter beamformer of each of the channel modules, each of the transmitter beamformers converts a part of the transmitter beamforming information into a plurality of transmitter beamforming signals according to the identification code correspondingly, each of the transmitters transmits the transmitter beamforming signals to the probe adaptor, the transmitter beamforming signals drive the ultrasound probe to emit a plurality of ultrasound signals through the frontend channels, each of the receivers receives a plurality of reflected signals of the ultrasound signals through the ultrasound probe and the probe adaptor, each of the receiver beamformers converts the reflected signals into a plurality of receiver beamforming signals, the backend controller merges the receiver beamforming signals generated by each of the channel modules into a scanning line signal according to the identification codes, and the demodulator divides the scanning line signal into an in-phase signal and a quadrature-phase signal.

2. The ultrasound scanning system of claim 1, wherein each of the channel modules further comprises a power supply for supplying power to the switch, the transmitter, the transmitter beamformer, the receiver and the receiver beamformer.

3. The ultrasound scanning system of claim 1, wherein the identification code of each of the channel modules is assigned by the backend controller.

4. The ultrasound scanning system of claim 1, wherein the probe adaptor comprises a plurality of first connectors, each of the channel modules comprises two second connectors, the backend controller comprises a plurality of third connectors, one of the two second connectors is detachably connected to one of the first connectors, and the other one of the two second connectors is detachably connected to one of the third connectors.

5. The ultrasound scanning system of claim 4, wherein the identification code of each of the channel modules is obtained by detecting positions of the first connector and the third connector connected to each of the channel modules.

6. The ultrasound scanning system of claim 1, further comprising a clock coupled to the transmitter beamformer of each of the channel modules and the receiver beamformer of each of the channel modules, the clock provides clock signals for the transmitter beamformer and the receiver beamformer.

7. The ultrasound scanning system of claim 1, further comprising a memory coupled to the backend controller, the memory storing the in-phase signal and the quadrature-phase signal of the scanning line signal.

8. The ultrasound scanning system of claim 1, further comprising a connecting interface coupled to the backend controller and connected to an image processing device.

9. The ultrasound scanning system of claim 1, wherein the probe adaptor is connected to a plurality of the ultrasound probes, each of the ultrasound probes has a unique code, and the backend controller controls one of the ultrasound probes to perform an ultrasound scanning process according to the unique codes of the ultrasound probes.

10. The ultrasound scanning system of claim 9, wherein when a number of channels of the ultrasound probe, which is performing the ultrasound scanning process, are different from a total number of channels of the channel modules, the backend controller switches the channels of the ultrasound probe in response to the channels of the channel modules correspondingly.

11. The ultrasound scanning system of claim 1, wherein the ultrasound probe comprises a sensor, the sensor senses a sensing value, and the backend controller reads the sensing value through the probe adaptor.

12. An ultrasound scanning method applied to an ultrasound scanning system, the ultrasound scanning system comprising a probe adaptor, a plurality of channel modules and a backend controller, the channel modules being coupled to the probe adaptor, the backend controller being coupled to the probe adaptor and the channel modules, the probe adaptor being connected to an ultrasound probe, the probe adaptor having a plurality of frontend channels, each of the channel modules having an identification code, the ultrasound scanning method comprising steps of:
 the backend controller transmitting a transmitter beamforming information to each of the channel modules;
 each of the channel modules converting a part of the transmitter beamforming information into a plurality of transmitter beamforming signals according to the identification code correspondingly and transmitting the transmitter beamforming signals to the probe adaptor;
 the transmitter beamforming signals driving the ultrasound probe to emit a plurality of ultrasound signals through the frontend channels;
 each of the channel modules receiving a plurality of reflected signals of the ultrasound signals through the ultrasound probe and the probe adaptor and converting the reflected signals into a plurality of receiver beamforming signals; and
 the backend controller merging the receiver beamforming signals generated by each of the channel modules into a scanning line signal according to the identification codes and dividing the scanning line signal into an in-phase signal and a quadrature-phase signal.

13. The ultrasound scanning method of claim 12, further comprising step of:
 assigning the identification code of each of the channel modules by the backend controller.

14. The ultrasound scanning method of claim 12, wherein the probe adaptor comprises a plurality of first connectors, each of the channel modules comprises two second connectors, the backend controller comprises a plurality of third connectors, one of the two second connectors is detachably connected to one of the first connectors, the other one of the two second connectors is detachably connected to one of the third connectors, the ultrasound scanning method further comprises step of:
 detecting positions of the first connector and the third connector connected to each of the channel modules, so as to obtain the identification code of each of the channel modules.

15. The ultrasound scanning method of claim 12, wherein the probe adaptor is connected to a plurality of the ultrasound probes, each of the ultrasound probes has a unique code, the ultrasound scanning method further comprises step of:
 the backend controller controlling one of the ultrasound probes to perform an ultrasound scanning process according to the unique codes of the ultrasound probes.

16. The ultrasound scanning method of claim 15, further comprising step of:
 when a number of channels of the ultrasound probe, which is performing the ultrasound scanning process, are different from a total number of channels of the channel modules, the backend controller switching the channels of the ultrasound probe in response to the channels of the channel modules correspondingly.

17. The ultrasound scanning method of claim 12, further comprising step of:
 the backend controller reading a sensing value sensed by the ultrasound probe through the probe adaptor.

18. An ultrasound scanning system comprising:
 a probe adaptor connected to an ultrasound probe, the probe adaptor having a plurality of frontend channels, the probe adaptor comprising a plurality of first connectors;
 a plurality of channel modules, each of the channel modules having an identification code, each of the channel modules comprising:
  a switch coupled to the probe adaptor;
  a transmitter coupled to the switch and the probe adaptor;
  a transmitter beamformer coupled to the transmitter;
  a receiver coupled to the switch;
  a receiver beamformer coupled to the receiver;
  two second connectors; and
  a demodulator coupled to the receiver beamformer;
 a backend controller coupled to the probe adaptor, the transmitter beamformer of each of the channel modules and the receiver beamformer of each of the channel modules, the backend controller comprising a plurality of third connectors, one of the two second connectors being detachably connected to one of the first connectors, and the other one of the two second connectors being detachably connected to one of the third connectors;
 wherein the backend controller transmits a transmitter beamforming information to the transmitter beamformer of each of the channel modules, each of the transmitter beamformers converts a part of the transmitter beamforming information into a plurality of transmitter beamforming signals according to the identification code correspondingly, each of the transmitters transmits the transmitter beamforming signals to the probe adaptor, the transmitter beamforming signals drive the ultrasound probe to emit a plurality of ultrasound signals through the frontend channels, each of the receivers receives a plurality of reflected signals of the ultrasound signals through the ultrasound probe and the probe adaptor, each of the receiver beamformers converts the reflected signals into a plurality of receiver beamforming signals, each of the demodulators divides each of the receiver beamforming signals into an in-phase signal and a quadrature-phase signal, the backend controller merges the in-phase signals generated by each of the channel modules into a single in-phase signal and merges the quadrature-phase signals generated by each of the channel modules into a single quadrature-phase signal according to the identification codes.

19. The ultrasound scanning system of claim 18, wherein each of the channel modules further comprises a power supply for supplying power to the switch, the transmitter, the transmitter beamformer, the receiver and the receiver beamformer.

20. The ultrasound scanning system of claim 18, wherein the identification code of each of the channel modules is assigned by the backend controller.

21. The ultrasound scanning system of claim 18, wherein the identification code of each of the channel modules is obtained by detecting positions of the first connector and the third connector connected to each of the channel modules.

22. The ultrasound scanning system of claim 18, further comprising a clock coupled to the transmitter beamformer of each of the channel modules and the receiver beamformer of each of the channel modules, the clock provides clock signals for the transmitter beamformer and the receiver beamformer.

23. The ultrasound scanning system of claim 18, further comprising a memory coupled to the backend controller, the memory storing the single in-phase signal and the single quadrature-phase signal.

24. The ultrasound scanning system of claim 18, further comprising a connecting interface coupled to the backend controller and connected to an image processing device.

25. The ultrasound scanning system of claim 18, wherein the probe adaptor is connected to a plurality of the ultrasound probes, each of the ultrasound probes has a unique code, and the backend controller controls one of the ultrasound probes to perform an ultrasound scanning process according to the unique codes of the ultrasound probes.

26. The ultrasound scanning system of claim 25, wherein when a number of channels of the ultrasound probe, which is performing the ultrasound scanning process, are different from a total number of channels of the channel modules, the backend controller switches the channels of the ultrasound probe in response to the channels of the channel modules correspondingly.

27. The ultrasound scanning system of claim 18, wherein the ultrasound probe comprises a sensor, the sensor senses a sensing value, and the backend controller reads the sensing value through the probe adaptor.

28. An ultrasound scanning method applied to an ultrasound scanning system, the ultrasound scanning system comprising a probe adaptor, a plurality of channel modules and a backend controller, the channel modules being coupled to the probe adaptor, the backend controller being coupled to the probe adaptor and the channel modules, the probe adaptor being connected to an ultrasound probe, the probe adaptor having a plurality of frontend channels, each of the channel modules having an identification code, the probe adaptor comprising a plurality of first connectors, each of the channel modules comprising two second connectors, the backend controller comprising a plurality of third connectors, one of the two second connectors being detachably connected to one of the first connectors, the other one of the two second connectors being detachably connected to one of the third connectors, the ultrasound scanning method comprising steps of:
    detecting positions of the first connector and the third connector connected to each of the channel modules, so as to obtain the identification code of each of the channel modules;
    the backend controller transmitting a transmitter beamforming information to each of the channel modules;
    each of the channel modules converting a part of the transmitter beamforming information into a plurality of transmitter beamforming signals according to the identification code correspondingly and transmitting the transmitter beamforming signals to the probe adaptor;
    the transmitter beamforming signals driving the ultrasound probe to emit a plurality of ultrasound signals through the frontend channels;
    each of the channel modules receiving a plurality of reflected signals of the ultrasound signals through the ultrasound probe and the probe adaptor and converting the reflected signals into a plurality of receiver beamforming signals;
    each of the channel modules dividing each of the receiver beamforming signals into an in-phase signal and a quadrature-phase signal; and
    the backend controller merging the in-phase signals generated by each of the channel modules into a single in-phase signal and merging the quadrature-phase signals generated by each of the channel modules into a single quadrature-phase signal according to the identification codes.

29. The ultrasound scanning method of claim 28, further comprising step of:
    assigning the identification code of each of the channel modules by the backend controller.

30. The ultrasound scanning method of claim 28, wherein the probe adaptor is connected to a plurality of the ultrasound probes, each of the ultrasound probes has a unique code, the ultrasound scanning method further comprises step of:
    the backend controller controlling one of the ultrasound probes to perform an ultrasound scanning process according to the unique codes of the ultrasound probes.

31. The ultrasound scanning method of claim 30, further comprising step of:
    when a number of channels of the ultrasound probe, which is performing the ultrasound scanning process, are different from a total number of channels of the channel modules, the backend controller switching the channels of the ultrasound probe in response to the channels of the channel modules correspondingly.

32. The ultrasound scanning method of claim 28, further comprising step of:

the backend controller reading a sensing value sensed by the ultrasound probe through the probe adaptor.

* * * * *